H. W. SHEPARD.

Handles for Milk-Cans.

No. 5,280. Reissued Feb. 11, 1873.

*Witnesses:*
T. C. Brecht.
Edwin James

*Inventor:*
Henry W. Shepard.
per J. E. H. Holmead
Attorney.

AM. PHOTO-LITHOGRAPHIC CO. N.Y. (OSBORNE'S PROCESS.)

UNITED STATES PATENT OFFICE.

HENRY W. SHEPARD, OF NEW YORK, N. Y.

IMPROVEMENT IN HANDLES FOR MILK-CANS.

Specification forming part of Letters Patent No. 103,933, dated June 7, 1870; reissue No. 5,280, dated February 11, 1873.

*To all whom it may concern:*

Be it known that Letters Patent of the United States numbered 103,933, for Improvements in Milk-Can Handles, were granted to me, HENRY W. SHEPARD, of the city, county, and State of New York, on the 7th day of June, 1870; and that the following is a full, clear, and exact description of the same, reference being had to the accompanying drawing and the letters of reference marked thereon making part of this specification, in which—

Figure 1:
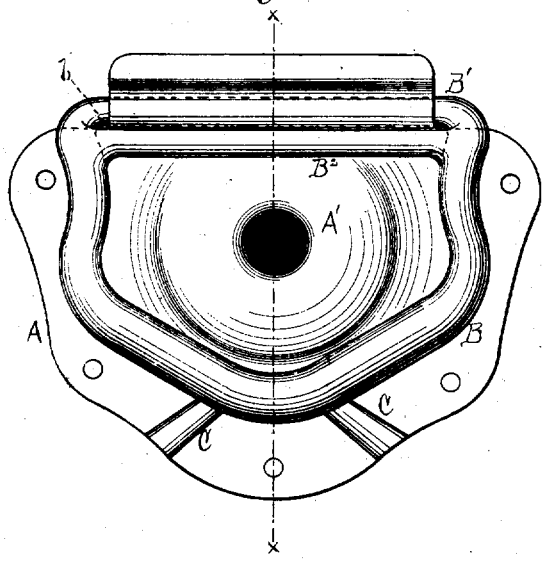
Figure 2:
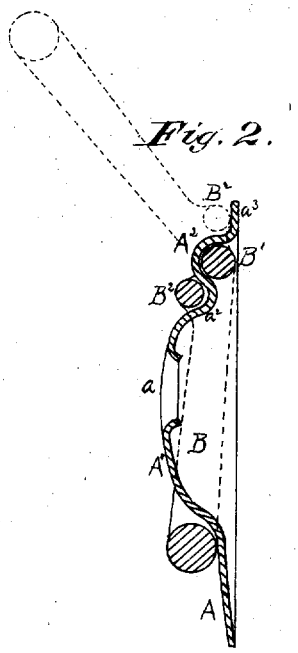
Figure 4:
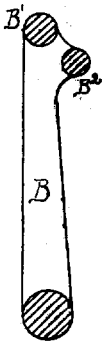
Figure 3:
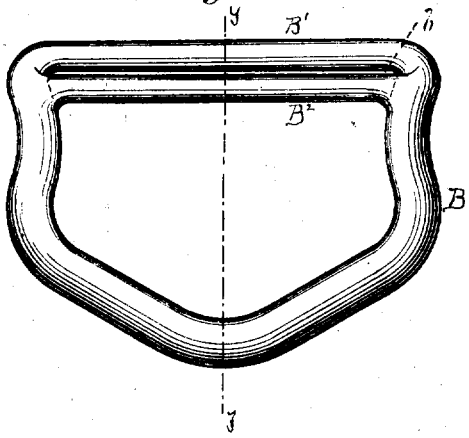
Figure 5:
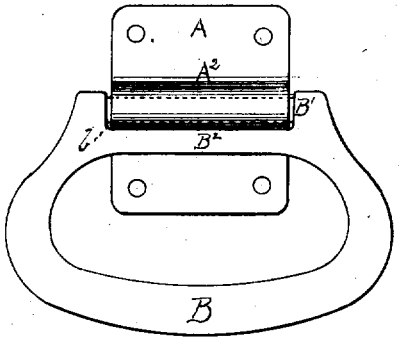

Figure 1 is a front view of the handle and shield. Fig. 2 is a vertical sectional view on the line *x x*, Fig. 1. Fig. 3 is a front view of the handle. Fig. 4 is a vertical sectional view on the line *y y*, Fig. 3. Fig. 5 is a front view of my improved handle secured to an ordinary grooved plate.

The object of this invention is the production of a handle for milk-cans that shall be both cheap and durable, one that will enable the can to be overturned and emptied with the utmost facility, and that, while being transported, will not bruise the other cans sitting near. The nature of my invention consists in forming the handle proper with two cross-bars at its upper section—one a bearing-bar, by which the handle is secured, and the other a stop guard or bar, which, when the handle is to be used, prevents its being elevated beyond the desired degree. These two bars run parallel to each other, but are not in the same plane, being so arranged as to leave an oblique slot, through which is introduced the shield or plate in connection with which the handle is secured. This arrangement of handle permits of a partial revolution of the stop around the bearing-bar as if it were around a center, and the movement of the handle is arrested at the desired elevation. My invention also consists in securing the handle with a shield or plate, which is stamped out of a single piece of metal, and so formed as to have a curved flange at its upper section, in which is secured and works the bearing-bar of the handle, and a raised center, in which is a circular hoisting aperture or opening, while in the lower portion of the shield, and extending from the raised center to the outside of the shield, are two grooves, so formed as to carry off any water that may be introduced between the shield and the can through the opening, either when the can is exposed to the rain, or when placed in water for the purpose of cooling, and thus prevent the shield or can from rusting.

By this arrangement of handle, it makes no difference if, in the hurry of emptying the can, the bails are placed in the opening in the raised center of the shield, or are fastened to the handle, since the more you lift the handle the tighter it holds on. When the handle is down it rests around the base of the raised center of the shield, this center being so curved as to allow of the most perfect freedom of movement of the handle up and down when desired. This raised center also extends sufficiently far to protect the handle, and presents a perfectly smooth surface, so that in transporting the cans there is no danger of the handle of one can bruising the can near it.

The construction and operation of my invention are as follows: A is the shield or plate, which is stamped out of one piece of wrought-iron, having a raised center, $A^1$, as clearly shown in Figs. 1 and 2. The upper section of this shield is a grooved flange-plate, of such dimensions as to permit of its being introduced between the parallel bars of the handle, whereby its bearing-bar can be received and secured in the groove $A^2$, while, at the center of its raised portion, there is a hoisting opening or aperture, *a*, in which are secured the hooked ends of the bail, when it is desired to elevate the can so as to cant it, in order the more readily to empty the same. C C are grooves, extending from the lower portion of the raised center $A^1$, to the bottom of the shield A, for the purpose of carrying off any water which may enter the opening *a* and lodge between the shield and the can, when the latter is exposed to the rain, or placed in water for the purpose of cooling the milk, and by this means preventing either the can or shield from rusting. B is the handle, which is made of malleable-iron, and is constructed in the ordinary form, but with two parallel bars, $B^1$ $B^2$, at its upper section, the former being the bearing-bar, which is secured and held in the groove $A^2$, and the other the stop guard or bar, which prevents the handle being elevated beyond the desired point. These two bars are not in the same plane, but are arranged so as to leave an oblique slot, *b*, between the same. Through this slot *b* is passed the flanged plate, and secured, as clearly shown in Fig. 2. Before the shield A is fastened to the can, the curved flange $A^2$ of the shield is passed between the bar $B^1$ of the handle B and the stop-guard $B^2$. When the shield is attached, the upper crook $a^3$ of the curved flange $A^2$ rests against the body of the can, and thus prevents the handle B from coming loose, while, the top bar $B^1$ of the handle being circular in form, perfect freedom of movement up and down is allowed to the handle, the space formed by the lower crook $a^2$ of the curved flange $A^2$ and the outside of the can being sufficient to allow the top bar $B^1$ to turn freely. When the handle B is raised, the stop-guard $B^2$ strikes the upper crook $a^3$ of the curved flange $A^2$, and the more pressure that is brought to bear to lift the handle, the tighter becomes its hold. The raised center $A^1$ is sufficiently raised to protect the handle B from being broken when the same is down, while the sweep of its curve is adequate enough to allow the handle to be freely moved over the same in raising, as clearly shown in Fig. 2.

What I claim as new, and desire to secure by Letters Patent of the United States, is—

1. The handle B having parallel bars $B^1$ $B^2$, so as to afford, when used in connection with any ordinary handle-plate having a groove or recess or a sheet-metal fastening or loop, a continuous bearing-bar and stop-guard, substantially as described.

2. The shield A, when the same is stamped out of one piece of metal, having a curved flange, $A^2$, raised center $A^1$ with its opening *a* and grooves C C, and the handle B with its stop-guard $B^2$, when the whole is so constructed and arranged as to form a milk-can handle, substantially as described.

In testimony whereof I have signed my name to this specification before two subscribing witnesses.

H. W. SHEPARD.

Witnesses:
GEO. B. PATTERSON,
JOHN B. BAKER.